Dec. 19, 1961  N. L. CARR  3,013,864
GRAPHITE FORMING PROCESS
Filed Oct. 30, 1959
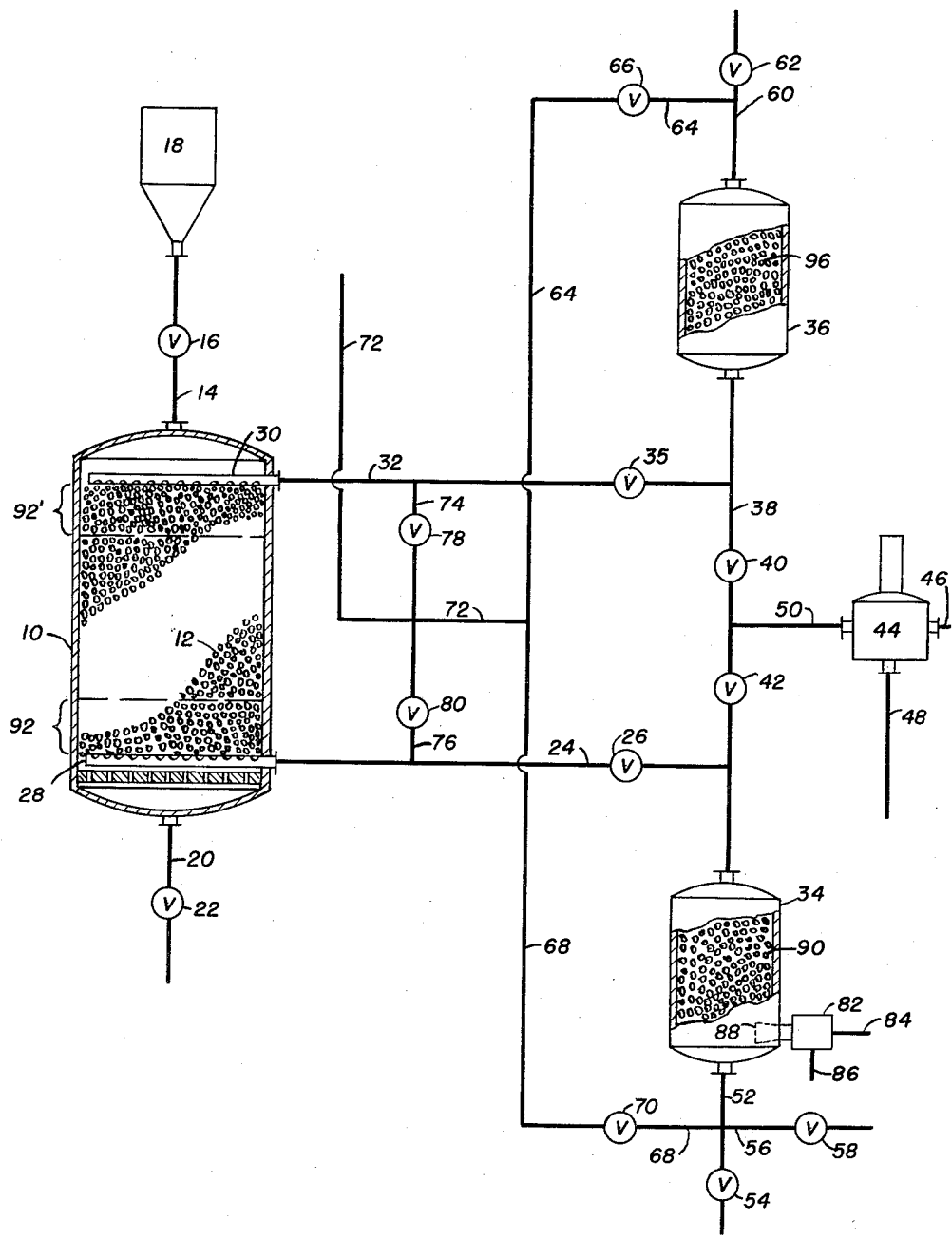
INVENTOR.
NORMAN L. CARR
BY
Edward H Long
ATTORNEY

United States Patent Office 3,013,864
Patented Dec. 19, 1961

3,013,864
GRAPHITE FORMING PROCESS
Norman L. Carr, Allison Park, Pa., assignor to The Pure Oil Company, Chicago, Ill., a corporation of Ohio
Filed Oct. 30, 1959, Ser. No. 849,846
12 Claims. (Cl. 23—209.1)

This invention relates to a process of preparing graphite from coke and, more particularly, to a method of preparing graphite from coke pebbles using the "pebble-bed" reactor technique.

As disclosed in United States Patent 2,780,527 by M. M. Marisic and Le Roi E. Hutchings, graphite is a crystalline form of carbon possessing hexagonal symmetry with planes of carbon atoms in hexagonal rings. Graphite is remarkably soft. The crystal readily splits off thin flakes whose cleavage planes undoubtedly are identical with the planes of the carbon atoms of the crystal. Graphite is widely used as a pigment, as a material for high temperature crucibles and retorts, and as a basic constituent of pencil "lead." Graphite is also extensively used in the manufacture of electrodes, and has found application in various oil and water formulations as a lubricant.

A small amount of graphite is supplied from natural sources, mainly from older crystalline rocks, such as gneiss, granulite, schist and crystalline limestone. By far the largest production of graphite, however, is from the electric furnace process which converts carbon into graphite at very high temperatures. The raw material is usually petroleum coke, although anthracite coal or other sources of carbon may be used. The raw material usually contains enough carbide-forming material so that the necessary transformation from carbon to graphite may take place. In the electric arc process, the feed material may be mixed with a little tar, and sometimes sand and sawdust, and the required article molded to shape. The articles are then stacked transversely in an electric arc furnace, each being packed in granular coke. If the graphite powder is desired, rather than a molded article, coke in lump or granular form is introduced without molding. The electric furnace usually has graphite block walls and electrodes at each end. A current of about 3000 amperes at 220 volts is applied to the articles and the current is gradually increased up to 9000 amperes at 20 volts after 20 hours. Carbide is first formed from the various metallic constituents in the coke, and then dissociates at about 2250° F. Usually a temperature of 5400° C. is achieved in order to obtain substantially pure graphite. Graphite may also be made in the electric furnace by the high temperature decomposition, approximately 5000–7000° F., of Carborundum to silicon vapors and graphite.

Despite the production of substantially pure graphite by the electric arc process, certain disadvantages are apparent. First and foremost, the electric arc process is expensive, requiring a large initial outlay for the electric furnace and supplementary equipment. The amount of electricity required to convert the coke or anthracite to graphite is large, so that favorable geographical locations for plants producing graphite are restricted to areas near large sources of cheap electricity, usually hydroelectric power. Transportation charges to parts of the country not having indigenous graphite-producing plants increase costs. Additionally, the electric arc process is relatively slow, consuming up to 20 or more hours in an average run. Many electric arc processes also require slow heating of the furnace to about 1800° C., which adds to the processing time.

It therefore appears that a process not employing electrical resistance as the prime source of heat necessary to reach the high coke-graphite conversion temperatures would be advantageous. Heretofore, carbonaceous material has been converted to activated carbon, and other amorphous carbon forms requiring only relatively low temperatures for conversion, by the use of non-electric processes employing metallic reaction vessels. However, production of graphite in metal, particularly iron or steel, reactor vessels has not been attempted, since it is well known that the usual metals utilized for process vessels become soft and may actually melt at the very high temperatures required for the efficient conversion of carbonaceous material to graphite.

From this it is apparent that although coke can be converted to graphite by maintaining it at temperatures greater than about 4000° F. for periods of 10 hours or more, this conversion is relatively costly because of the large amounts of energy (fuel) that are required to supply the heat and attain the high temperatures necessary. The instant process is based on the discovery that graphite can be prepared from coke pebbles using the pebble-bed reactor technique.

It becomes therefore a main object of this invention to provide a process for the production of graphite from coke.

Another object of the invention is to provide a process of producing graphite from coke pebbles.

A further object of the invention is to provide a process for producing graphite from coke pebbles by treatment in a pebble-bed reactor.

These and further objects of the invention will become apparent as the description proceeds.

The invention is best explained by reference to the drawing which is a flow diagram showing the pebble-bed reactor and related heating apparatus. The process is based on the use of a bed of pelleted or briquetted coke as a "pebble-bed" during its conversion to graphite. The process includes auxiliary pebble-beds which serve as heat reservoirs to preheat a combustion gas used to burn a portion of the coke-pebble bed and form a high temperature reaction zone. The auxiliary pebble-beds also serve to preheat an inert gas used to move this hot reaction zone back and forth through the coke-pebble bed. By this means the process allows great reductions in the amount of externally-applied heat required to cause the desired conversion from coke to graphite. Another feature of the invention is that it avoids exposing piping and valves to temperatures greater than about 1500° F. which permits the use of standard materials for this auxiliary equipment.

Referring to the drawing, it is seen that the properly insulated reactor 10 containing bed 12 of pelleted, briquetted, or otherwise uniformly particulate coke, is connected by means of line 14, controlled by valve 16 to hopper 18. The graphite product is dumped through an expandable grate into conduit 20 controlled by valve 22 provided at the bottom of reactor 10. Line 24, controlled by valve 26 leads to distribution head 28 into the bottom of reactor 10. A second distribution head 30 is located in the top of the reactor and connected to line 32 controlled by valve 35.

Two auxiliary pebble-bed heaters 34 and 36 are connected to lines 24 and 32, respectively, by means of branch line 38 controlled by valves 40 and 42. Flue gas generator 44 with inlet lines 46 and 48 is connected to line 38 between valves 40 and 42 by means of line 50. Line 52 controlled by valve 54 leads from the bottom of pebble heater 34. Recycle line 56 controlled by valve 58 is connected to line 52. Similarly, draw-off line 60 controlled by valve 62 is connected to the top of pebble-bed 36. Branch line 64 controlled by valve 66 and branch line 68 controlled by valve 70 are joined between draw-off lines 52 and 60 and form vent line 72. Branch lines 74 and 76 controlled by valves 78 and 80, respectively, connect between lines 32 and 24 into line 72. Vessel 34 is fitted with burner 82 having inlet lines 84 and 86 and burner barrel 88.

In order to start the process burner 82 is operated by means of air introduced at line 86 and fuel introduced at line 84 to produce hot combustion gases from barrel 88. Burner 82 is run until pebble-bed 90 in reactor 34 attains a temperature of about 1000° to 1500° F. During the start-up stage, the hot combustion gases can be conducted into lines 38, 24, 76 and 72 for venting to the atmosphere. When all of bed 90 has attained the desired temperature, burner 82 is turned off, valve 80 is closed and oxygen-containing gas is introduced through line 52 and valve 54, into bed 90. Upon passing through bed 90 the oxygen-containing gas becomes heated to the bed temperature and passes through lines 38, 24 and valve 26 and into distributor 28 in reaction vessel 10.

The introduction of heated oxygen into reaction vessel 10 causes partial combustion of the coke pebbles 12. This creates a zone 92 of coke particles which are at a temperature of 4000° to 5000° F. The cooler combustion products from this reaction phase leave reactor 10 through distributor 30, lines 32, line 74, valve 78 and vent line 72. When the hot zone 92 has attained a sufficient size, valve 54 is closed, terminating the flow of oxygen-containing gas; and then hot flue gas from flue gas generator 44, prepared by burning a mixture of fuel introduced at line 46 and air introduced at line 48 is passed through line 50 into line 38 through valve 42 into line 24 through valve 26 and into distributor 28 in reaction vessel 10. The influx of hot flue gas at a temperature of about 1000° to 1500° F. gradually moves the hot zone 92 upward through bed 12 in conventional pebble-bed fashion. Cooled flue gases are discarded through line 32, valve 78 in line 74 and into vent line 72.

When hot zone 92 approaches the top of bed 12 as evidenced by an increase in the temperature of the gases leaving through line 32, valves 26, 78 and 42 are closed and the hot flue gas is passed from generator 44 through line 50, valve 40, line 38 into line 32 through valve 35 and into distributor head 30 in the top of reactor 10. At this time hot zone 92 is at position 92'. With the introduction of hot flue gas at the top of reactor 10, hot zone 92 is caused to move downward through bed 12. Because all of the bed below the hot zone is at about 1500° F., the temperature of the flue gas, the flue gas issued from reactor 10 through line 24 is at this temperature. In order to retain the heat from this gas in the process, the gas is passed through line 24, valve 26, line 38 into pebble bed vessel 34. Passage of the flue gas through vessel 34 heats pebble-bed 90 to a temperature above about 1000° F. The effluent flue gas is discarded through line 52, line 68, valve 70 and into vent line 72.

When hot zone 92 approaches the bottom of bed 12 in reactor 10, the downward flow of flue gas therein is again reversed. However, at this time "cold" flue gas from an external source is introduced in line 56 through valve 58 and upwardly through line 52 into the bottom of reactor 34. This flue gas becomes preheated by passing through bed 90 and flows into line 38 through valve 26 into line 24 through distribution head 28 into reactor 10 where it pushes hot zone 92 up through bed 12. The gases now leaving bed 12 and reactor 10 are at a temperature of between about 1000°–1500° F. and are passed into line 32 through valve 35 into line 38 and into the bottom of reactor 36 wherein it heats pebble-bed 96 to serve as a heat reservoir. The cooled flue gas is discarded by passage into lines 60, 64 through valve 66 and into vent line 72. Alternatively, the cooled flue gas from reactor 36 can be recycled back through line 56, controlled by valve 58 and into line 52 leading to the bottom of reactor 34 for preheating and passage back into reactor 10. Thereafter, when hot zone 92 is to be moved downward through bed 12, cold flue gas from an external source (line 56) or from another source is preheated by passage through bed 96 of reactor 36. When the heated flue gas issuing from bed 96 or bed 90 is not hot enough for use in pushing hot zone 92 upward or downward in bed 12, hot flue gas can be introduced from generator 44 to provide the desired temperature.

Thereafter, hot zone 92 is moved upwardly and downwardly in bed 12 until its temperature has dropped below the effective level for conversion of coke to graphite, or until conversion has been substantially completed, whereupon flue gas introduction is terminated with zone 92 at about the middle of bed 12. Under these conditions the temperature of zone 92 is permitted to drop appreciably by letting the heat slowly transmit itself throughout the rest of bed 12. Following this, unconverted coke is optionally removed by passing oxygen-containing gas through bed 12 and the bed is cooled to near ambient temperature by contact with cold flue gas and steam which may be introduced at line 56. After it has been cooled, bed 12, consisting of graphite in combination with some coke, is withdrawn through line 20 and valve 22. The coke is removed, as for example by burning, and the graphite is screened, ground and/or otherwise prepared for use or sale.

It has been found in accordance with this invention that the degree of graphitization is dependent upon the time/temperature requirement relationship in the bed 12. In general, substantially complete conversion of coke to graphite can be accomplished by continuing the cycles of movement of the hot zone 92 upwardly and downwardly through bed 12 until the entire bed has been at a temperature greater than 4000° F. for at least 24 hours. Thus, if the hot zone 92 occupies 25% of the total bed 12, the cycles are continued for at least 96 hours. The exact time/temperature relationship required for substantially complete conversion of a particular coke to graphite can be determined by trial and error, and ascertaining the degree of graphitization by subjecting selected samples of the products to analysis by X-ray diffraction or by the chemical method of Berthelot. Having determined the time/temperature requirement for the reaction, successive batches of coke are subjected to a standardized time cycle based thereon.

One of the principal features of this invention is the use of the single reactant (coke) as a pebble bed. This eliminates the necessity of using fillers composed of chemically inert, refractory solids. Another feature of the invention is the saving in heat brought about by the fact that the entire mass of coke does not have to be heated to the graphitization temperature of 4000° to 5000° F. during any one period of time, nor is it necessary to maintain more than about 25% of the coke at the graphitization temperature any more than a short period of time as it moves upwardly and downwardly through the bed of coke pebbles. Furthermore, because the temperatures of the gases issuing from the reacting bed of coke do not exceed about 1500° F., inexpensive piping and conventional valves may be used to convey the gases taking part in the reaction. This contributes additional economy to the construction and operation of the process.

In order to demonstrate the invention, the following non-limiting example is given:

20 lbs. of pelleted coke is charged into a reactor. Heated air at about 1200° F. is introduced into the reactor from a pebble bed heater. The pebble coke begins to burn creating a zone of coke particles at about 4500° F. Hot flue gas at 1200° F. is then introduced against the zone of burning coke moving it to the other end of the reactor. The flow of hot flue gas is reversed to force the zone of burning coke back to the starting point in the reactor. The effluent from these operations is used to heat the pebble bed heater. Cold flue gas is passed through the reheated pebble heater and used to force the hot zone of coke pebbles back to the other end of the reactor. The effluent from this operation is used to preheat a second pebble heater. Cold flue gas is introduced through the second pebble heater and into the reactor to force the hot zone of coke pebbles to the starting point again. After 10 cycles of operation, the temperature of coke pebbles drops to below 4000° F. and the reactor is allowed to cool with the hot zone in the middle thereof. A total of 18 lbs. of graphite is obtained from the bottom portion of the reactor and about 66.5 lbs. of air is supplied to the process.

The oxygen-containing gas may be air or mixtures of oxygen and an inert gas such as nitrogen wherein the mixtures contain from about 10% oxygen to 100% oxygen. The flue gases may be prepared from burning oil, coal, or gases such as natural gas. Nitrogen may be used as the inert gas.

The process is operated either batchwise, as illustrated, or continuously. In the continuous operation, considering a vertical reactor, additional pellets of coke are added to the top of the reactor, sufficient to fill the void spaces therein, at each downward movement of the hot zone of burning coke. The addition of fresh coke pellets may be made continuous by pressurizing hopper 18 with the hot gases from reactor 10, thus allowing gravity feed. Product removal may be intermittent or continuous. If the product removal is continuous, a second pressurized hopper at the bottom of reactor 10, connected to line 20, may be used. Intermittent reheating of zone 90 may be practiced at certain intervals in the process. Instead of transferring the hot flue gases from reactor 10 on one or more of the cycles therethrough, this gas may be vented and the idle pebble bed preheated by means of heater 82. The heater 82 may also be used to preheat bed 96 by opening valves 40 and 42 in line 38. Similarly, the flue gases from burner 44 may be used to preheat either of beds 90 or 96. An important feature of the invention is the combined use of coke pellets and the oscillation of the hot zone therethrough at graphite-forming temperatures. Although an over-all operation may require as much as 100 hours, the result is a substantially complete conversion of the coke to graphite.

The process is applicable to the preparation of graphite by passing an oxygen-containing gas through a bed of pelleted coke at a graphite-forming temperature without moving the hot zone thus created through the bed of coke. However, the main objectives of the process, that is, increased yields of graphite, less heat consumption and greater facility in handling the reaction, are experienced by applying the technique of hot zone manipulation that has been described. A feature of the invention is to use the hot flue gases from each hot zone transfer cycle to re-heat the auxiliary pebble beds 90 and 96. The cycles wherein hot flue gases are used to move the hot zone of burning coke pebbles back and forth through the reactor may be associated with one or more cycles wherein hot oxygen-containing gas from burner 82 is passed into reactor 10, at the time the hot zone is in position 92, to bring the hot zone up to graphite-forming temperatures. Such a procedure allows the operation of the process at the lower end of the graphite-forming temperature range and results in increased heat savings. The use of associated cycles wherein hot oxygen-containing gas is introduced may be advantageously used to maintain the hot zone 92 at the upper end of the graphite-forming temperature i.e., at about 7000° F. when a shorter reaction time is demanded of the process. Preferably the ratio of the volume of hot zone 92 to the total volume of the coke pellet bed is between about 1:5 to 1:2 and the preferred volume ratio is about 1:4.

Various modifications or additions of the process steps and/or the apparatus may be used without departing from the scope of the invention.

The embodiments of the invention in which an exclusive property or privilege is claimed are defined as follows:

1. The process of preparing graphite comprising maintaining a stationary bed of pelleted coke in a reactor, passing a predetermined quantity of an oxygen-containing gas at a temperature of about 1000° to 1500° F. into one end of said stationary bed of pelleted coke to form a hot zone of burning coke pellets at a graphite-forming temperature therein, then passing an inert gas at a temperature of about 1000° to 1500° F. into said reactor against said hot zone of burning coke pellets to thereby transfer said hot zone to the other end of said reactor, thereafter intermittently reversing the direction of flow of said hot inert gas into each end of said reactor to move said hot zone back and forth therethrough at graphite-forming temperatures periodically introducing an oxygen-containing gas into said bed of pelleted coke at a temperature of about 1000° F. to 1500° F. to maintain said hot zone at a minimum temperature of about 4000° F. and recovering graphite from said reactor.

2. The process in accordance with claim 1 in which the effluent, hot, inert gas from each cycle of transfer of said hot zone through said reactor is passed through a separate inert pebble bed to preheat same and a subsequent cycle of inert gas is passed through the resultant preheated pebble bed to bring said inert gas to the temperature of introduction.

3. The process of preparing graphite comprising establishing a stationary bed of pelleted coke in a reactor communicating with a heat reservoir, passing a predetermined quantity of an oxygen-containing gas at a temperature of about 1000° to 1500° F. into said stationary bed to form a hot zone of burning coke pellets at a graphite-forming temperature therein, said hot zone comprising less than ½ of the total volume of said stationary bed, then introducing an inert gas preheated to a temperature of about 1000° to 1500° F. against said hot zone to thereby transfer said hot zone to the remaining portion of said stationary bed, passing the effluent hot inert gases into said heat reservoir, thereafter intermittently reversing the direction of flow of said hot inert gas through said reactor by way of said heat reservoir to continuously transfer said hot zone back and forth therethrough at graphite-forming temperatures and recovering graphite from said process.

4. The process in accordance with claim 3 in which said heat reservoir comprises a first and second pebble bed, said preheated inert gas is prepared by passage of a cool inert gas through said first heated pebble bed prior to entry into said stationary bed of pelleted coke and the effluent inert gas from said stationary bed is recycled through said second preheated pebble bed prior to use in the next cycle of transfer of said hot zone in said reactor.

5. The process of preparing graphite comprising contacting a bed of pelleted coke with an oxygen-containing gas at a temperature of about 1000° to 1500° F. to create therein a hot zone of burning coke at a graphite-producing temperature, moving said hot zone back and forth through said bed of pelleted coke by cyclic introduction of an inert gas at a temperature of about 1000° to 1500° F., periodically treating said bed of pelleted coke with an oxygen-containing gas at a temperature of about 1000° to 1500° F. to maintain said combustion zone at a graphite-producing temperature and recovering graphite from the process.

6. The process in accordance with claim 5 in which said graphite-producing temperature is at least about 4000° F., and said hot zone of burning coke pellets comprises less than one half of the total volume of said bed of pelleted coke.

7. The process of preparing graphite comprising maintaining a stationary bed of pelleted coke in a reactor and a first and second pebble bed in communication therewith, heating said first pebble bed to a temperature of about 1000° to 1500° F., passing an oxygen-containing gas through said first pebble bed to preheat same to bed temperature, passing the effluent preheated oxygen-containing gas into the bottom of said reactor to create a lower combustion zone therein at a graphite-producing temperature, introducing an inert gas at a temperature of about 1000° to 1500° F. into the bottom of said reactor to move said combustion zone upward to the top of said reactor, reversing the flow of hot inert gas in said reactor to move said combustion zone to the bottom of said reactor, utilizing the heat of the effluent gases from said steps of moving said combustion in said reactor to maintain the heat in said first and second pebble beds, continuing the reversal of flow of hot inert gases through said reactor by way of said pebble beds alternately until said reaction to produce graphite is complete and recovering the graphite from the reactor.

8. The process in accordance with claim 7 in which the hot combustion zone is intermittently heated with an oxygen-containing gas at a temperature of about 1000° to 1500° F. to maintain said combustion zone at the upper end of the graphite-forming temperature.

9. The process in accordance with claim 7 in which the effluent inert gases from the movement of said hot combustion zone up and down within said reactor during each cycle are passed through one of the pebble beds to maintain the temperature therein at a level of at least about 1000° F.

10. The process of preparing graphite comprising maintaining a stationary bed of pelleted coke in a reactor and a first and second pebble bed in communication therewith, heating said first pebble bed to a temperature of about 1000° to 1500° F., passing an oxygen-containing gas through said first pebble bed to preheat said oxygen-containing gas to bed temperature, passing said preheated oxygen-containing gas into the bottom of said bed of pelleted coke whereby a lower combustion zone at a temperature of about 4000° to 7000° F. is created, introducing flue gas at a temperature of about 1000° to 1500° F. into the bottom of said bed of pelleted coke to gradually move said combustion zone upward to the top of said stationary bed, reversing the flow of hot flue gases in said stationary bed to move said combustion zone downward therethrough, passing the effluent gases from said stationary bed into said first pebble bed to maintain the temperature therein above about 1000° F., introducing cold flue gas through said first pebble bed into the bottom of said stationary bed when said combustion zone has reached the bottom thereof to again reverse the direction of travel of said combustion zone, passing the effluent gases from said stationary bed through said second pebble bed to preheat same to a temperature above about 1000° F., thereafter passing cold flue gas into said first and second pebble beds after same have been preheated, using the preheated flue gas therefrom to move said combustion zone back and forth through said pelleted coke bed with intermittent introduction of separately preheated oxygen-containing gas to maintain said combustion zone and removing graphite from said reactor.

11. The process in accordance with claim 10 in which said cycles of movement of said combustion zone through said reactor are continued until the entire bed has been at a temperature greater than 4000° F. for at least 24 hours.

12. The process in accordance with claim 10 in which the intermittent introduction of separately preheated oxygen-containing gas is used to maintain said combustion zone at a temperature of about 7000° F. and the ratio of the volume of said combustion zone to the total volume of the coke pellet bed is between about 1:5 to 1:2.

References Cited in the file of this patent

UNITED STATES PATENTS

| 1,789,380 | Edwards et al. | Jan. 20, 1931 |
| 1,975,259 | Derby | Oct. 2, 1934 |

FOREIGN PATENTS

| 1,018,852 | Germany | Nov. 7, 1957 |